US012629872B2

(12) United States Patent　　(10) Patent No.:　US 12,629,872 B2

Harui et al.　　(45) Date of Patent:　May 19, 2026

---

(54) RESIN MOLD

(71) Applicant: Mitsubishi Electric Corporation, Tokyo (JP)

(72) Inventors: Yasuyuki Harui, Tokyo (JP); Ryuki Nakamura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 91 days.

(21) Appl. No.: 18/706,915

(22) PCT Filed: Feb. 3, 2023

(86) PCT No.: PCT/JP2023/003606

§ 371 (c)(1),
(2) Date: May 2, 2024

(87) PCT Pub. No.: WO2023/157680

PCT Pub. Date: Aug. 24, 2023

(65) Prior Publication Data

US 2025/0018624 A1　　Jan. 16, 2025

(30) Foreign Application Priority Data

Feb. 15, 2022　(JP) ................................. 2022-020932

(51) Int. Cl.
| | |
|---|---|
| *B29C 45/04* | (2006.01) |
| *B29C 45/17* | (2006.01) |
| *B29C 45/76* | (2006.01) |

(52) U.S. Cl.
CPC ...... *B29C 45/0416* (2013.01); *B29C 45/1761* (2013.01); *B29C 45/7653* (2013.01); *B29C*

*2945/76013* (2013.01); *B29C 2945/76224* (2013.01); *B29C 2945/76387* (2013.01)

(58) Field of Classification Search
CPC ............ B29C 45/0416; B29C 45/1761; B29C 45/7653

See application file for complete search history.

(56) References Cited

U.S. PATENT DOCUMENTS

| | | | |
|---|---|---|---|
| 11,148,330 B2 * | 10/2021 | Kung | .................. B29C 45/1771 |
| 2001/0010172 A1 | 8/2001 | Kawasaki et al. | |
| 2017/0080621 A1 | 3/2017 | Kikumori | |

FOREIGN PATENT DOCUMENTS

| | | | | |
|---|---|---|---|---|
| CN | 111347641 | A * | 6/2020 | ............ B29C 45/76 |
| JP | H0475930 | U | 7/1992 | |
| JP | H09109199 | A | 4/1997 | |
| JP | 2001212853 | A | 8/2001 | |
| JP | 2006289945 | A | 10/2006 | |
| JP | 2013154507 | A | 8/2013 | |
| JP | 2021010922 | A | 2/2021 | |

(Continued)

OTHER PUBLICATIONS

Machine translation KR920003153Y1 (Year: 1992).*

(Continued)

*Primary Examiner* — Abbas Rashid

*Assistant Examiner* — Wayne K. Swier

(74) *Attorney, Agent, or Firm* — .Buchanan Ingersoll & Rooney PC

(57) ABSTRACT

A resin molding mold of the present disclosure includes: a slide core slidably attached to a guide rail; and a sensor for detecting a force applied to the guide rail when the slide core slides.

6 Claims, 10 Drawing Sheets

(56)             References Cited

FOREIGN PATENT DOCUMENTS

| | | | | |
|---|---|---|---|---|
| KR | 920003153 | Y1 * | 5/1992 | ......... B29C 45/4435 |
| WO | 2015186417 | A1 | 12/2015 | |
| WO | 2016167337 | A1 | 10/2016 | |

OTHER PUBLICATIONS

Machine translation JPH0475930U (Year: 1992).*
Machine translation JPH09109199A (Year: 1997).*
Machine translation JP2013154507A (Year: 2013).*
Machine translation CN111347641A (Year: 2020).*
International Search Report (PCT/ISA/210) with English translation and Written Opinion (PCT/ISA/237) mailed on Mar. 28, 2023, by the Japanese Patent Office as the International Searching Authority for International Application No. PCT/JP2023/003606, 8 pages.

* cited by examiner

RESIN MOLD

TECHNICAL FIELD

The present disclosure relates to a resin molding mold.

BACKGROUND ART

In a mold including a slide core having an angular pin, sliding failure often occurs. For detecting sliding failure, an acceleration sensor is used, whereby change in the acceleration when the sliding resistance increases, i.e., whether or not galling has occurred, can be detected (see, for example, Patent Document 1).

CITATION LIST

Patent Document

Patent Document 1: Japanese Laid-Open Patent Publication No. 2021-10922 (paragraph [0018], FIG. 1)

SUMMARY OF THE INVENTION

Problem to be Solved by the Invention

However, as shown in Patent Document 1, the acceleration sensor is used at a part subjected to impact as in a working machine or a press machine, and in a case of a small-sized mold as in a 100-ton molding machine, minute galling and sliding failure cannot be detected.

The present disclosure has been made to solve the above problem, and an object of the present disclosure is to provide a resin molding mold that allows detection for galling and sliding failure even at a small-sized slide core as in a 100-ton molding machine.

Means to Solve the Problem

A resin molding mold according to the present disclosure includes: a slide core slidably attached to a guide rail; and a sensor for detecting a force applied to the guide rail when the slide core slides.

Effect of the Invention

The resin molding mold according to the present disclosure allows detection for galling and sliding failure of a slide core even in a case where the slide core has a size for a small-sized mold.

DESCRIPTION OF EMBODIMENTS

Embodiment 1

Figure 1:
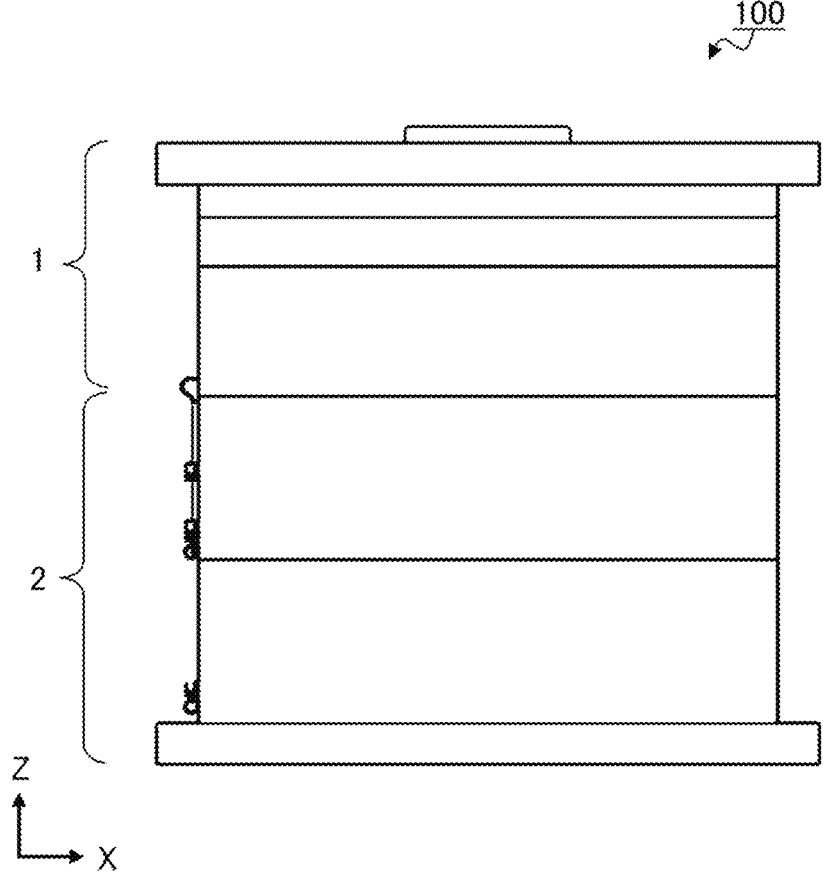
FIG. 1 is a front view showing the structure of a resin molding mold according to embodiment 1.
Figure 2:
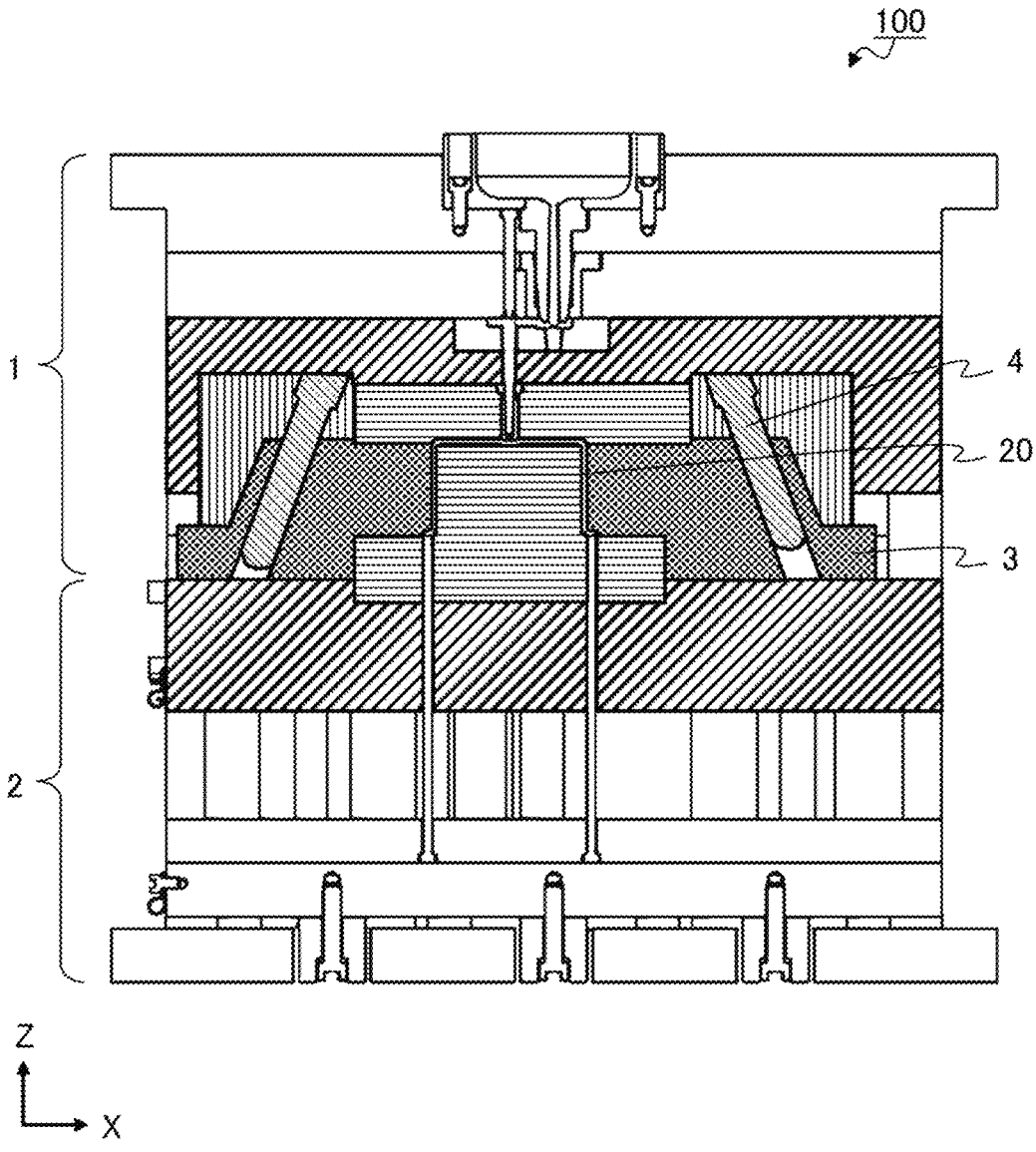
FIG. 2 is a sectional view showing the structure of the resin molding mold according to embodiment 1.
Figure 3:
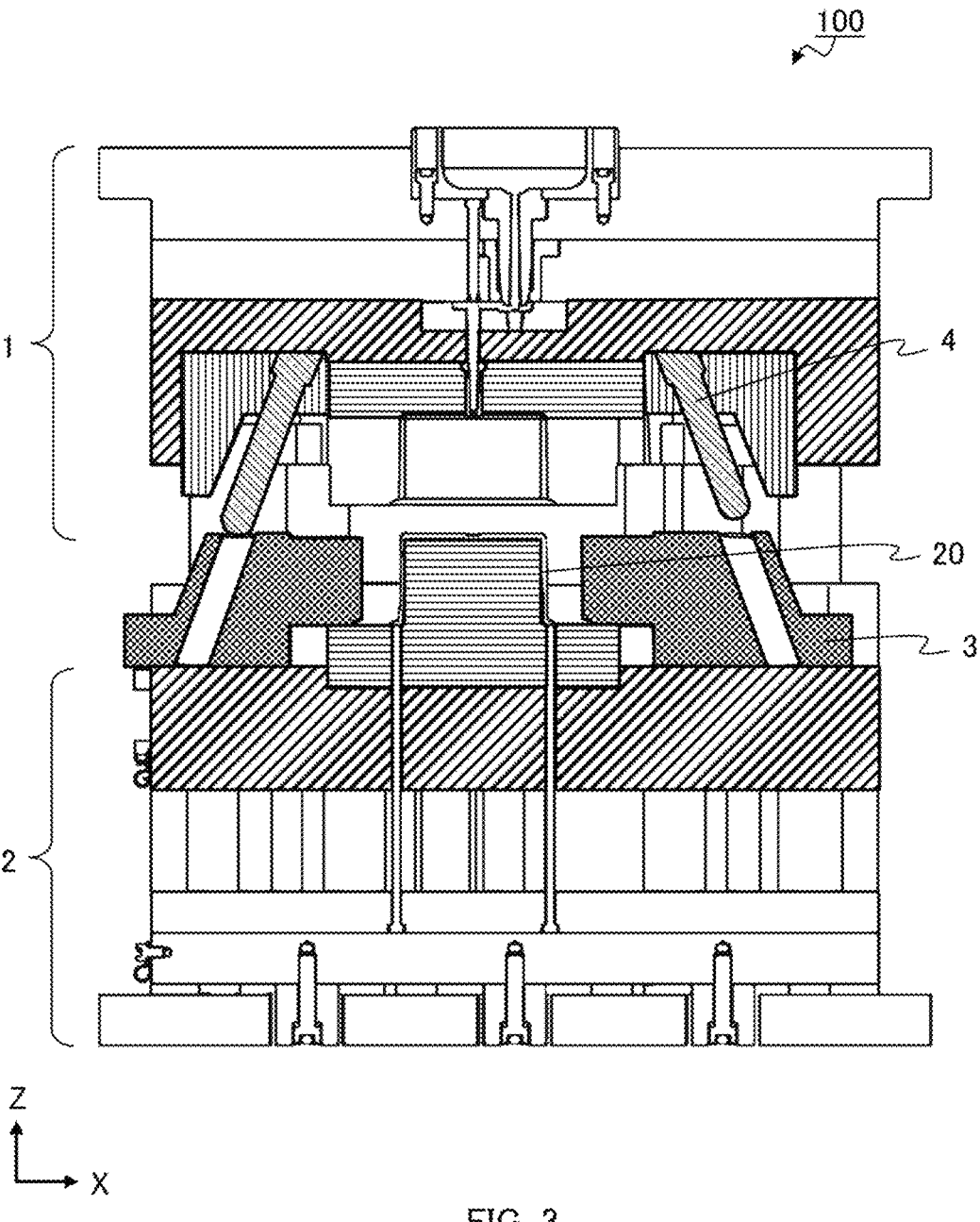
FIG. 3 is a sectional view showing the structure of the resin molding mold according to embodiment 1.
Figure 4:
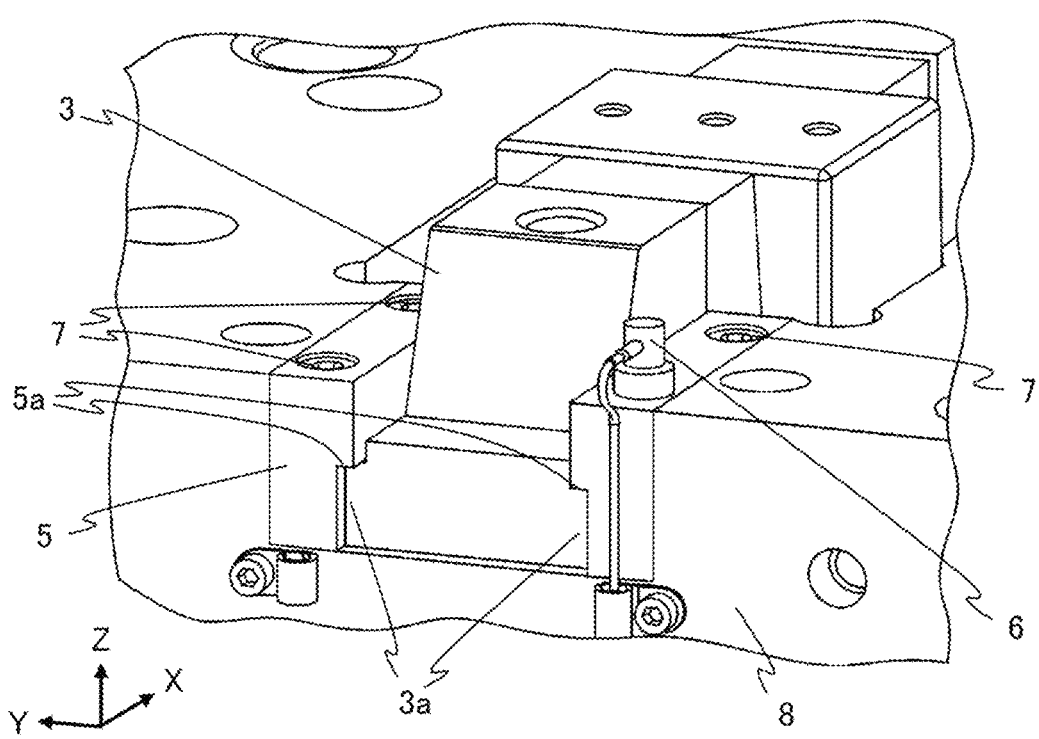
FIG. 4 is a perspective view showing the structure of a major part of the resin molding mold according to embodiment 1.

FIG. 1 is a front view showing the structure of a resin molding mold 100 according to embodiment 1 of the present disclosure. FIG. 2 is a sectional view (XZ cross-section) of FIG. 1, and FIG. 3 is a sectional view (XZ cross-section) when the mold is opened. FIG. 4 is a perspective view of a slide core part of the resin molding mold 100. In FIG. 1 to FIG. 4, an XYZ coordinate system is shown and an XY plane is defined as a horizontal plane.

As shown in FIG. 1, the resin molding mold 100 includes a fixed die 1 and a movable die 2. The fixed die 1 is retained at a predetermined position by a molding machine (not shown). The movable die 2 is also retained at a predetermined position by the molding machine (not shown) and performs reciprocating movement in a predetermined direction (here, Z-axis direction). Thus, the movable die 2 is retained such that the movable die 2 can be pressed and fitted to the fixed die 1 and can be moved for mold release. When the mold is clamped with the movable die 2 pressed and fitted to the fixed die 1, a product cavity 20 including substantially the same shape as that of a resin molding product is formed between the movable die 2 and the fixed die 1.

Depending on the product shape, an undercut can occur so that molding cannot be performed through only an open/close operation of the mold described above. Accordingly, in the resin molding mold 100, a slide core 3 is used for molding a part at the undercut. The slide core 3 has a part for forming a recess shape and a hole shape of a product. The slide core 3 can be moved by being connected to a hydraulic cylinder or can be moved by an inclined pin, and can be moved along the horizontal plane (here, XY plane) or in some cases, in an oblique direction, instead of the vertical direction (here, Z-axis direction) which is a mold open/close direction.

As shown in FIG. 2, the resin molding mold 100 includes the slide core 3 and a thin long angular pin 4 which is an inclined pin for moving the slide core 3 when the mold is opened or closed.

When the mold is opened, the resin molding mold 100 comes into a state in which the slide core 3 is retracted as shown in FIG. 3. While the resin molding mold 100 is opened, the slide core 3 moves in the horizontal direction until the inclined angular pin 4 is fully pulled out from a hole corresponding to the angular pin 4 in the slide core 3.

As shown in FIG. 4, the resin molding mold 100 according to embodiment 1 of the present disclosure has a feature that a load sensor 6 is provided to a guide rail 5 for fixing and moving the slide core 3. As the load sensor 6, a bolt-type sensor called PiezoBolt manufactured by Yamanaka Eng Co., Ltd. is used. The load sensor 6 has a piezoelectric element buried inside the bolt and can measure a load of pulling and compression in the axial direction applied to a bolt shank lower part. In addition, a cable for transferring data can be mounted at the bolt head. By replacing an already provided bolt with the bolt-type sensor, change in a load of pulling and compression in the axial direction applied to the bolt shank lower part at the bolt fastening position can be detected.

The slide core 3 is provided so as to be movable in a predetermined direction (here, X-axis direction) relative to the movable die 2. The slide core 3 has, at both ends on the lower side, brim portions 3a for movement relative to the movable die 2. The slide core 3 and the guide rail 5 are configured such that the guide rail 5 having downward-facing steps 5a for guiding and preventing both brim portions 3a, 3a from floating up holds the brim portions 3a of the slide core 3 and contacts with the upper surfaces and both side surfaces of the brim portions 3a so as to guide them. The guide rail 5 is attached to a movable-side plate 8 by a plurality of bolts 7. Thus, when the movable die 2 is separated from the fixed die 1 to open the mold, the slide core 3 can be moved in the predetermined direction relative to the movable die 2.

As described above, in the resin molding mold 100 according to embodiment 1, one of the plurality of bolts 7 fastening the guide rail 5 is replaced with a bolt-type sensor having the load sensor 6. Thus, without impairing fastening of the guide rail 5 and without attaching a sensor at a special location, it is possible to attach the guide rail 5 to the movable-side plate 8 in the same manner as in a case of attaching the guide rail 5 to the movable-side plate 8 by normal bolts 7, and in addition, it is possible to easily detect galling and sliding failure of the slide core by providing the load sensor 6 to the guide rail 5.

Figure 5:
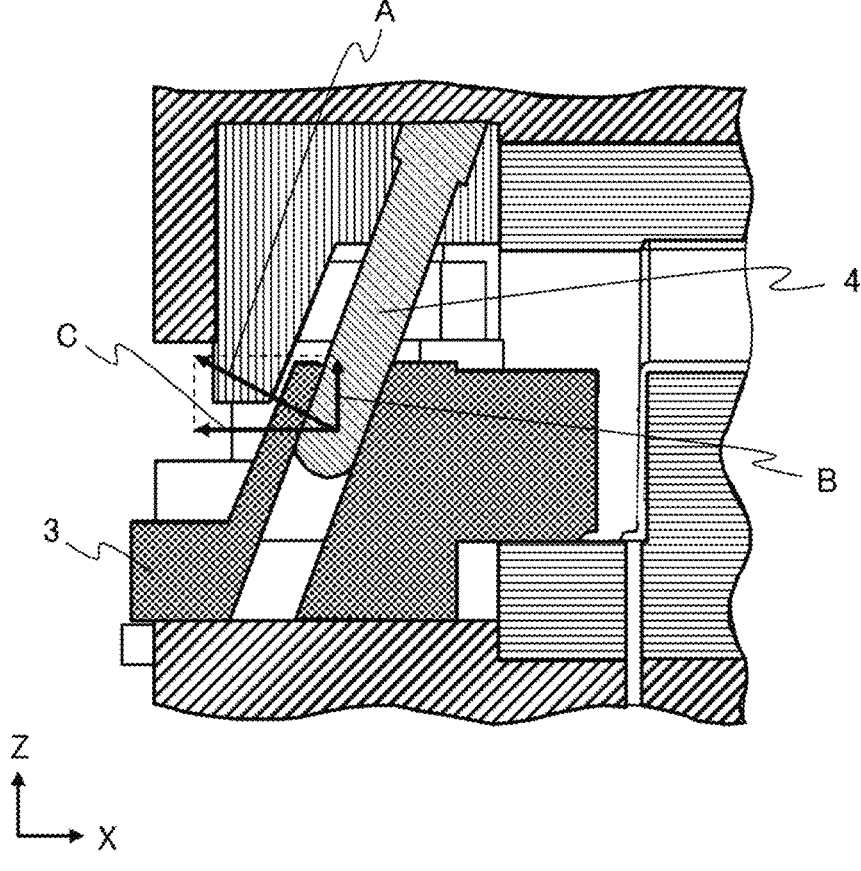
FIG. 5 is a sectional view showing the structure of a major part of the resin molding mold according to embodiment 1.

FIG. 5 is a sectional view showing a state during retraction of the slide core at the time of mold opening in the resin molding mold 100 according to embodiment 1. As described above, when the resin molding mold 100 is opened, the slide core 3 is moved in the horizontal direction by the inclined angular pin 4. At this time, a force A in a normal direction of the inclined angular pin 4 acts on the slide core 3, as shown in FIG. 5. A force component B which is a vertical-direction force component (here, Z-axis direction) of the force in the normal direction is applied to the slide core 3. Since the slide core 3 is attached to the guide rail 5, the force component B is applied to the guide rail 5.

Since the guide rail 5 is fastened by the load sensor 6, i.e., the bolt-type sensor, the force component B of the force in the normal direction of the angular pin 4 is directly applied to the load sensor 6, i.e., the fastening bolt. Every time the resin molding mold 100 is opened, the load sensor 6 is subjected to the vertical-direction force component B of the force in the normal direction of the angular pin 4. For example, in a case where grease at the sliding surface of the slide core 3 runs out and in a case where a foreign material is present at the sliding surface of the slide core 3, the sliding resistance force of the slide core 3 increases. The sliding resistance force can be confirmed at each time the resin molding mold 100 is opened, and the resistance force when the slide core 3 slides can be directly measured by the load sensor 6 at each time the resin molding mold 100 is opened.

The load sensor 6 is connected via a wire to a measurement device and a computer prepared on a work table outside the molding machine. The computer includes a storage device storing a predetermined program, a processor, an input device, and an output device. The computer acquires time-series data of the above-described load value change from the load sensor 6. The computer executes the predetermined program using the time-series load value data, and outputs a result of the execution. The predetermined program is configured to perform determination for occurrence of galling using the load value data acquired from the load sensor 6, for example. As the computer, a personal computer can be used, for example. The computer may notify a user that "galling has occurred", using a display device, a sound output device, or the like.

Next, a result of measuring the load value will be described using an example of the resin molding mold 100 described above.

Using the example of the resin molding mold 100, resin molding was performed consecutively a plurality of times, under a predetermined molding condition. Specifically, in one cycle of resin molding, a mold clamping step, an injection and cooling step, a mold opening step, and a product ejection step are performed in this order.

In the mold clamping step, the movable die 2 is pressed and fitted to the fixed die 1 along with movement of the molding machine. In the injection/cooling step, molten resin is injected into the product cavity 20 so as to fill the inside. Thereafter, the resin molding mold 100 is cooled to solidify the resin, whereby a predetermined molding product is formed. Then, in the mold opening step, the movable die 2 is moved so as to be separated from the fixed die 1 along with movement of the molding machine. At his time, the slide core 3 is separated from the molding product in order to form an undercut part. Thereafter, in the product ejection step, the molding product is detached from the movable die 2, thus obtaining a resin molding product.

Figure 6:
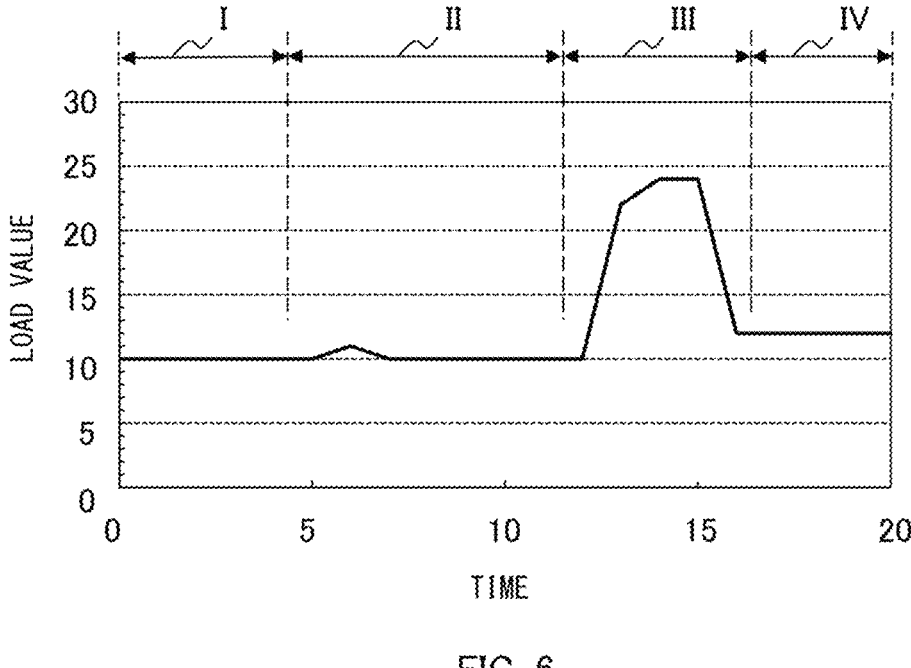
FIG. 6 shows an example of a result of measuring a load value applied to a guide rail in the resin molding mold according to embodiment 1.
Figure 7:
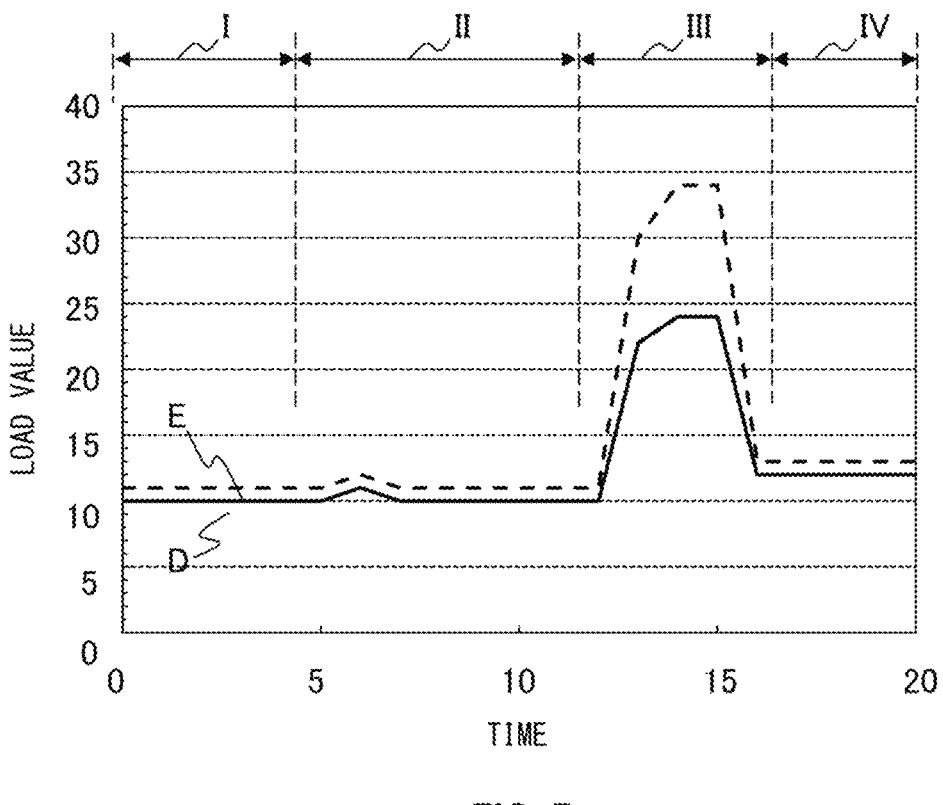
FIG. 7 shows an example of load value data under the assumption that galling of a slide core has occurred in the resin molding mold according to embodiment 1.

In the resin molding process through the above plurality of steps, the load value applied to the guide rail 5 when the slide core 3 is moved is measured, and FIG. 6 shows an example of the measurement result. In the resin molding mold 100, since the guide rail 5 is fastened by the bolt-type sensor having the load sensor 6, the load value applied to the guide rail 5 is an output value of the load sensor 6. FIG. 7 shows an example of a graph in which load value data in a case of normal molding and load value data under the assumption that galling of the slide core 3 has occurred are drawn in an overlapping manner. In a case E under the assumption that galling of the slide core 3 has occurred, i.e., a case where the sliding resistance is increased by narrowing the gap between the brim portion 3a of the slide core 3 and the downward-facing step 5a of the guide rail 5, the load value exhibited a significant difference as compared to a case D of normal molding.

As shown in FIG. 6, the load value which is a force component applied vertically upward to the guide rail 5 changes through one cycle of resin molding. The load value applied to the guide rail 5 greatly changes in the mold opening step III, and hardly changes in the mold clamping step I, the injection/cooling step II, and the product ejection step IV.

In the mold clamping step I, a force applied vertically upward does not occur, unlike the mold opening step III, and therefore the load value which is a force component applied vertically upward to the guide rail 5 does not change.

In the injection/cooling step II, since movement of the slide core 3 does not occur, there is no change in the load applied to the guide rail 5.

In the mold opening step III, as described above, the slide core 3 is moved by the inclined angular pin 4, and at this time, the force component B which is a vertically upward force component (here, Z-axis direction) applied to the slide core 3 is directly applied to the guide rail 5. Thus, the load value changes.

In the product ejection step IV, as in the injection/cooling step II, since movement of the slide core 3 does not occur, there is no change in the load applied to the guide rail 5.

Therefore, in the mold opening step III, while the slide core 3 is moved, change in the load value of the load sensor 6 can be detected. Thus, on the basis of the change in the load value, whether or not galling has occurred can be determined.

As shown in FIG. 7, it is found that the load value of the load sensor 6 in the case E under the assumption that galling has occurred is significantly higher than the load value of the load sensor 6 in the case D of normal molding.

As described above, by providing the load sensor 6 to the bolt for attaching the guide rail 5 for the slide core 3 to the movable-side plate 8, the load sensor 6 can measure a force applied during movement of the slide core 3, i.e., the load value of the force component B applied vertically upward to the guide rail 5, whereby the resistance force applied when the slide core 3 slides can be detected. Thus, using the load value, whether or not galling has occurred can be determined and the resistance force applied during sliding can be directly measured, whereby occurrence of galling can be detected with high accuracy.

That is, in resin molding, it is assumed that, for example, grease at a slide core sliding part runs out or a foreign material is present at the slide core sliding part, so that the sliding resistance of the slide core increases and galling occurs. In this case, a resistance applied to the angular pin during mold opening also increases, so that the load value in the direction vertical to the slide core sliding direction increases. Thus, the load sensor 6 detects the sliding resistance of the slide core in the vertical direction, whereby occurrence of galling can be detected with high accuracy.

Therefore, the load sensor can more detect galling and sliding failure even in a case of a slide core having a size for a small-sized mold, as compared to an acceleration sensor used for a part subjected to impact as in a working machine or a press machine.

In actuality, a mold having a weight of 350 kg was placed at a 100-$t$ molding machine and the mold was opened and closed in each of a case where grease for reducing the sliding resistance was applied on the sliding surface of the slide core 3 and a case where such grease was not applied. Then, the acceleration sensor used in Patent Document 1 could not detect an acceleration, but in the case of the resin molding mold 100 using the load sensor 6, change in the sliding resistance force applied to the slide core 3 can be significantly detected.

As described above, the resin molding mold 100 according to the present embodiment 1 includes: the slide core 3 slidably attached to the guide rail 5; and the load sensor 6 for detecting a force applied to the guide rail 5 when the slide core 3 slides. The load sensor 6 is provided to the bolt 7 fastening the guide rail 5 to the movable-side plate 8 and detects a force applied in the vertical direction to the guide rail 5, by a load. Thus, it is possible to detect galling and sliding failure of a slide core even in a case where the slide core has a size for a small-sized mold.

Embodiment 2

In embodiment 1, the load sensor 6 is provided to the bolt 7 fastening the guide rail 5, whereas in embodiment 2, a case where a sensor is provided at the bottom of the guide rail will be described.

Figure 8:
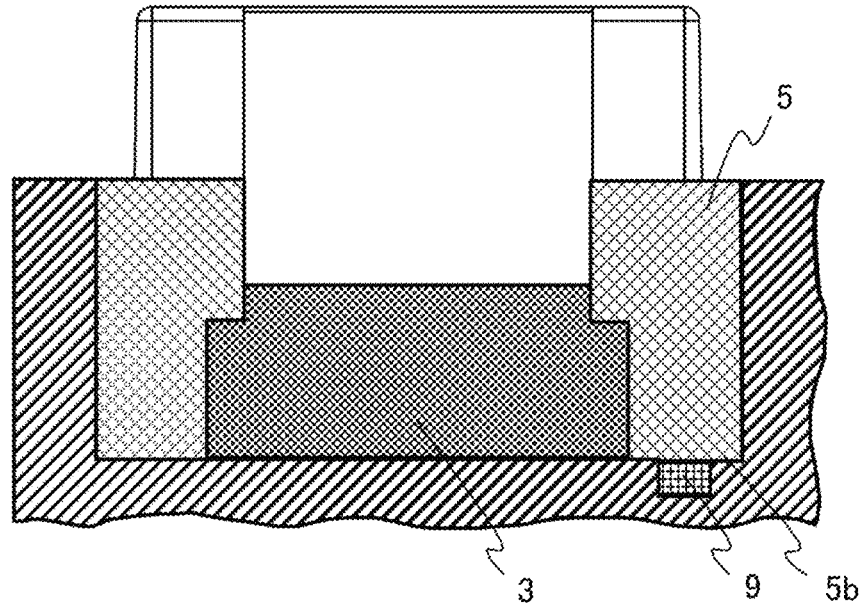
FIG. 8 is a sectional view showing the structure of a major part of a resin molding mold according to embodiment 2.

FIG. 8 is a sectional view showing a structure around the slide core and the guide rail of the resin molding mold 100 according to embodiment 2 of the present disclosure. As shown in FIG. 8, in the resin molding mold 100 according to embodiment 2, a button-type pressure sensor 9 is provided at a bottom 5*b* of the guide rail 5. The other structures of the resin molding mold 100 according to embodiment 2 are the same as those of the resin molding mold 100 according to embodiment 1, and corresponding parts are denoted by the same reference characters and the description thereof is omitted.

In the resin molding mold 100, a force applied during movement of the slide core 3, i.e., the load value of the force component B applied vertically upward to the guide rail 5 is measured using the load sensor 6 provided to the bolt 7 fastening the guide rail 5, in embodiment 1. However, it suffices that a sensor can detect the force component B applied vertically upward to the guide rail 5, and in embodiment 2, the button-type pressure sensor 9 provided at the bottom of the guide rail 5 as shown in FIG. 8 is used for measurement.

As the pressure sensor 9, a sensor of button type SSB series manufactured by Futaba Corporation is used. The pressure sensor 9 has a pressure element buried in its body and measures a pressure applied at the upper surface of the body. Conventionally, such a pressure sensor is used for measuring a resin pressure applied to the pressure sensor during molding, but the pressure sensor 9 is provided in contact with a bottom surface 5*b* of the guide rail 5, to measure the force component B applied vertically upward to the guide rail 5. A pressure value of the pressure sensor 9 in a state in which the guide rail 5 is fastened in a case of normal molding is used as a reference, and when the sliding resistance increases during movement of the slide core 3, i.e., when a force is applied vertically upward to the guide rail 5, the pressure value is reduced. Thus, whether or not galling has occurred can be determined. Also in this case, the same effects as in embodiment 1 can be obtained.

As described above, in the resin molding mold 100 according to the present embodiment 2, the pressure sensor 9 is provided at the bottom 5*b* of the guide rail 5, and detects the force applied in the vertical direction to the guide rail 5, by a pressure. Thus, as in embodiment 1, it is possible to detect galling and sliding failure of a slide core even in a case where the slide core has a size for a small-sized mold.

Embodiment 3

In embodiment 2, the pressure sensor 9 is provided at the bottom 5*b* of the guide rail 5, whereas in embodiment 3, a case where a sensor is provided at a side part of the guide rail will be described.

Figure 9:
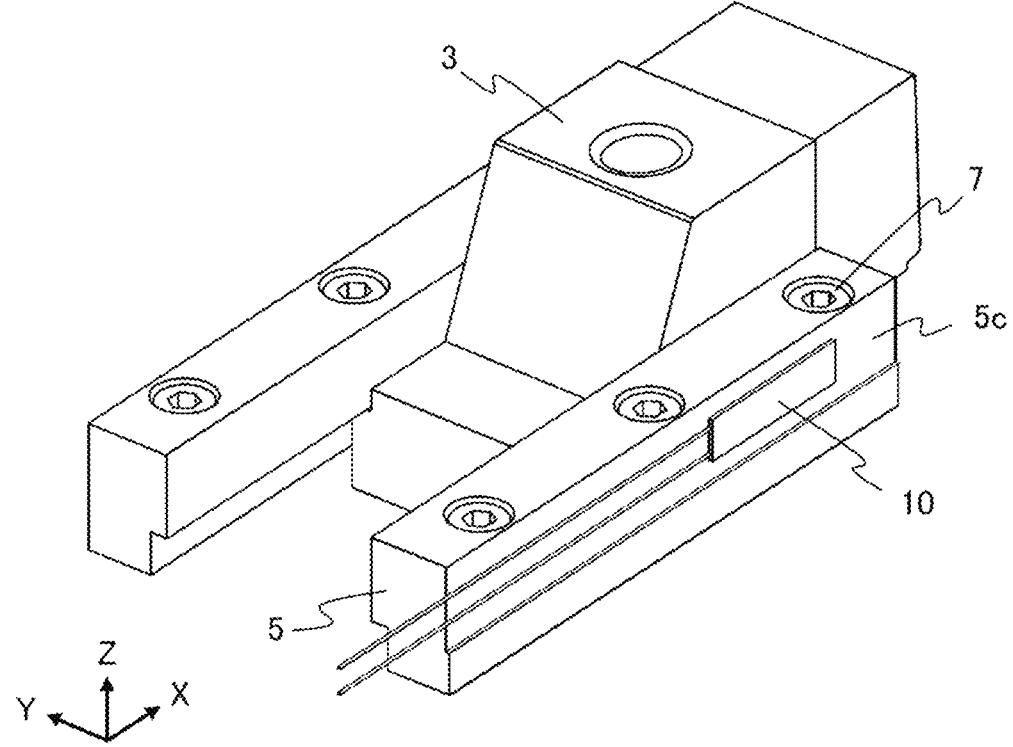
FIG. 9 is a perspective view showing the structure of a major part of a resin molding mold according to embodiment 3.

FIG. 9 is a perspective view showing a structure around the slide core and the guide rail of the resin molding mold 100 according to embodiment 3 of the present disclosure. As shown in FIG. 9, in the resin molding mold 100 according to embodiment 3, a strain gauge 10 is provided at a side 5*c* of the guide rail 5. The other structures of the resin molding mold 100 according to embodiment 3 are the same as those of the resin molding mold 100 according to embodiment 1, and corresponding parts are denoted by the same reference characters and the description thereof is omitted.

Depending on the shape of the guide rail 5 and the positions of the bolts 7, the guide rail 5 might strain when a force is applied vertically upward to the guide rail 5. In particular, in a case where the guide rail 5 has a long sliding distance and thus is long as compared to the slide core 3 and in a case where the guide rail 5 is thinned due to constraints of the mold, the guide rail 5 strains more significantly.

In the above embodiments 1 and 2, the load value of the force component B applied vertically upward to the guide rail 5 is measured, whereas in embodiment 3, for example, a recess is formed at the side 5*c* of the guide rail 5 so as not to influence movement of the slide core 3, and the strain gauge 10 is pasted on the recess, to measure strain thereof.

Thus, when the sliding resistance increases during movement of the slide core 3, a vertically upward force is applied to the guide rail 5, so that greater strain than in a case of normal molding can be detected, whereby whether or not galling has occurred can be determined. Also in this case, the same effects as in embodiment 1 can be provided.

As described above, in the resin molding mold 100 according to the present embodiment 3, the strain gauge 10 is provided at the side 5*c* of the guide rail 5, and detects a force applied in the vertical direction to the guide rail 5, by strain. Thus, as in embodiment 1, it is possible to detect galling and sliding failure of a slide core even in a case where the slide core has a size for a small-sized mold.

Embodiment 4

In embodiment 3, the strain gauge 10 is provided at the side 5*c* of the guide rail 5, whereas in embodiment 4, a case where a small-sized load sensor is provided at a side of the guide rail will be described.

Figure 10:
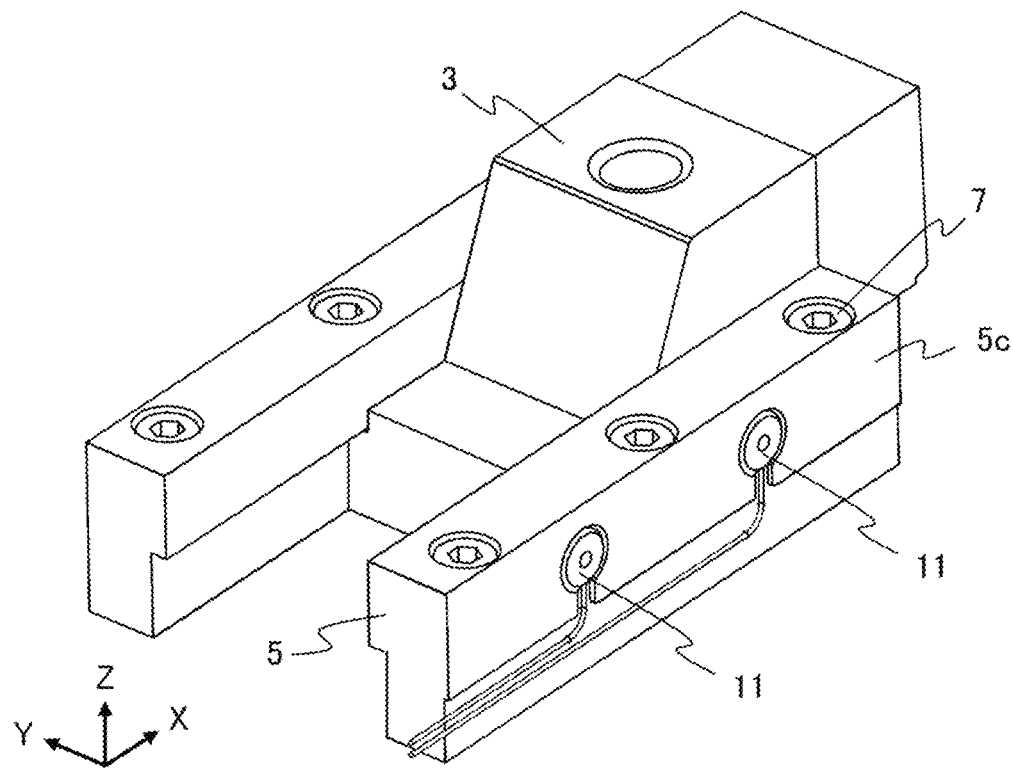
FIG. 10 is a perspective view showing the structure of a major part of a resin molding mold according to embodiment 4.

FIG. 10 is a perspective view showing a structure around the slide core and the guide rail of the resin molding mold 100 according to embodiment 4 of the present disclosure. As shown in FIG. 10, in the resin molding mold 100 according to embodiment 4, a plurality of load sensors 11 are provided at the side 5*c* of the guide rail 5. The other structures of the resin molding mold 100 according to embodiment 4 are the same as those of the resin molding mold 100 according to embodiment 1, and corresponding parts are denoted by the same reference characters and the description thereof is omitted.

The guide rail 5 might be displaced from a predetermined position, during molding when the bolt 7 is loosened through consecutive molding, or in the initial fastening state of the bolts 7. Due to the displacement, a difference arises in distances between left and right parts of the guide rail 5, so that galling and sliding failure of the slide core 3 might occur.

During molding, i.e., when the mold is opened or closed, it is desirable that the plurality of provided load sensors 11 are subjected to loads that are equal and do not change from the initial load values. The load sensors 11 can detect loads which change during molding and which can lead to galling and sliding failure of the slide core 3.

As described above, in the resin molding mold 100 according to the present embodiment 4, the load sensor 11 is provided at the side 5*c* of the guide rail 5, and detects displacement of the guide rail 5 from a predetermined position. Thus, as in embodiment 1, it is possible to detect galling and sliding failure of a slide core even in a case where the slide core has a size for a small-sized mold.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS

1 fixed die
2 movable die
3 slide core
5 guide rail
5*b* bottom
5*c* side
6 load sensor
7 bolt
9 pressure sensor
10 strain gauge
11 load sensor
100 resin molding mold

The invention claimed is:

1. A resin molding mold comprising"
a first die and second die
a slide core supported by the second die and slidably attached to a guide rail of the second die; and
a sensor for detecting a force applied to the guide rail in a direction toward the first die when the slide core slides along the guide rail.

2. The resin molding mold according to claim 1, wherein the sensor detects a force applied in a vertical direction to the guide rail.

3. The resin molding mold according to claim 2, wherein the sensor is a load sensor provided to a bolt fastening the guide rail, and detects the force applied in the vertical direction to the guide rail, by a load.

4. The resin molding mold according to claim 1, wherein the sensor is a pressure sensor provided at a bottom of the guide rail, and detects the force applied to the guide rail, by a pressure.

5. The resin molding mold according to claim 1, wherein the sensor is a strain gauge provided at a side of the guide rail, and detects the force applied to the guide rail, by strain.

6. The resin molding mold according to claim 1, wherein the sensor is a load sensor provided at a side of the guide rail, and detects the force applied to a side of the guide rail, by a load.

* * * * *